United States Patent
Shaul (10) Patent No.: US 8,821,100 B1
(45) Date of Patent: Sep. 2, 2014

(54) PORTABLE RAILCAR UNLOADING PIT AND METHOD OF USING THE SAME

(75) Inventor: Kenneth M. Shaul, Findlay, OH (US)

(73) Assignee: The National Lime and Stone Company, Findlay, OH (US)

( * ) Notice: Subject to any disclaimer, the term of this patent is extended or adjusted under 35 U.S.C. 154(b) by 772 days.

(21) Appl. No.: 12/546,734

(22) Filed: Aug. 25, 2009

Related U.S. Application Data (60) Provisional application No. 61/192,036, filed on Sep. 15, 2008.

(51) Int. Cl.
*B65G 65/00* (2006.01)

(52) U.S. Cl.
USPC .......................................................... 414/327

(58) Field of Classification Search
CPC ........ B65G 65/42; B65G 54/40; B65G 65/00;
B65G 67/00; B65G 47/18; B65G 67/24;
B65G 47/16; B60P 1/36; B60P 1/56; B65D
88/30; B65F 9/00; B61D 7/02; B61D 7/00
USPC ......... 414/327, 332, 339, 356, 359, 360, 371,
414/576, 809; 105/239, 244, 247, 243
See application file for complete search history.

(56) References Cited

U.S. PATENT DOCUMENTS

| | | | | |
|---|---|---|---|---|
| 1,177,353 A * | 3/1916 | Pratt | ............................. | 414/327 |
| 1,320,377 A * | 11/1919 | Budd | ........................... | 414/809 |
| 1,407,926 A | 2/1922 | Case | | |
| 1,496,196 A | 6/1924 | Auld | | |
| 1,545,865 A * | 7/1925 | Turek | ............................. | 414/360 |
| 1,593,303 A * | 7/1926 | Hill | ............................... | 414/363 |
| 1,735,022 A | 11/1929 | Strauss | | |
| 2,552,186 A | 1/1946 | Koehler | | |
| 2,608,311 A * | 8/1952 | Findlay | ........................ | 414/369 |
| 3,348,723 A * | 10/1967 | Wilson | ............................. | 220/6 |
| 3,799,620 A * | 3/1974 | Robinson et al. | ............... | 406/12 |
| 3,802,584 A * | 4/1974 | Sackett et al. | ................ | 414/376 |
| 3,984,289 A | 10/1976 | Sustarsic | | |
| 4,043,467 A | 8/1977 | Hand, Jr. | | |
| 4,416,547 A * | 11/1983 | Mikolajczyk | .............. | 366/153.3 |
| 4,508,211 A | 4/1985 | Foster | | |
| 4,531,877 A | 7/1985 | Carroll | | |
| 4,743,155 A | 5/1988 | Carey | | |
| 4,763,845 A * | 8/1988 | Guggenheimer et al. | ........................ | 241/101.71 |
| 4,925,356 A | 5/1990 | Snead | | |
| 5,015,120 A * | 5/1991 | Brock et al. | .................. | 404/108 |
| 5,302,071 A * | 4/1994 | Binzen | .......................... | 414/376 |
| 5,575,595 A | 11/1996 | Smoot | | |
| 5,890,868 A * | 4/1999 | Comardo | ..................... | 414/587 |
| 6,835,041 B1 | 12/2004 | Albert | | |
| 7,083,375 B2 * | 8/2006 | Lewis et al. | .................. | 414/809 |
| 2003/0230009 A1 * | 12/2003 | Chesner et al. | ................. | 37/345 |
| 2007/0297883 A1 * | 12/2007 | Ash | ............................... | 414/339 |

* cited by examiner

*Primary Examiner* — Saul Rodriguez
*Assistant Examiner* — Glenn Myers
(74) *Attorney, Agent, or Firm* — Marshall & Melhorn, LLC (57) ABSTRACT

A portable railcar unloading pit includes a pair of opposed steel sidewalls secured to a steel back wall to define an enclosure having an at least partially open top and an open front. A hopper is secured within the enclosure, with the hopper narrowing downwardly from an inlet proximate the top of the enclosure to an outlet. A pair of rail beams is supported over the inlet of the hopper, and a conveyor extends through the open front of the enclosure and is supported beneath the outlet of the hopper.

21 Claims, 9 Drawing Sheets

Fig. 9

PORTABLE RAILCAR UNLOADING PIT AND METHOD OF USING THE SAME

RELATED APPLICATION

This application is claiming the benefit, under 35 U.S.C. §119(e), of the provisional application filed Sep. 15, 2008 under 35 U.S.C. §111(b), which was granted Ser. No. 61/192, 036. This provisional application is hereby incorporated by reference in its entirety.

BACKGROUND OF THE INVENTION

The invention relates to material unloading devices and methods and, more particularly, to portable devices for use in unloading bulk materials from a railcar.

As used herein, bulk materials include aggregate, crushed stone, grains, sand, plastic pellets or other relatively free-flowing material that may be shipped in bulk by rail or bottom dump trucks. In situations where a relatively large amount of bulk material is required at a location at one time, for example for a large construction project, the amounts needed are, from a practical standpoint, too large to utilize trucks. In these situations, the use of railcars for transportation of the bulk material is necessary, as transportation of bulk material by railcar is significantly less expensive than by truck. However, once the bulk material has been transported to the desired site, it must still be unloaded from the railcars in an effective, cost-efficient manner.

The predominant type of railcar used for transporting bulk materials such as aggregate is an open top bottom dump hopper car, constructed of steel. Because these cars are emptied by dumping from the bottom, expensive permanent facilities are typically required beneath the railroad tracks to receive the dumped bulk materials. Typically, these facilities include large, rail-supporting I beams mounted in thick, high-strength concrete foundations cast in place beneath the railroad tracks. A steel hopper, sized to span the entire length of the railcar, is permanently installed beneath the beams. Vibratory feeders are generally required to center the unloaded bulk material from the hopper on one conveyor by which the unloaded bulk material is carried to a stockpile for later use.

These permanent unloading facilities generally take several months to install and are very expensive to build. Once built, such facilities are never moved, and typically only the hopper can be salvaged. The concrete foundation can only be abandoned or destroyed. Thus, these unloading facilities have been left in place once the site is no longer used for unloading bulk materials and are either left idle or demolished and reclaimed. The old, abandoned facilities can pose a hazard to the general public from a safety standpoint.

As an alternative to the permanent unloading facility, there has also been some use of conveyors designed to fit between the track and the railcar. However, the capacity of such systems is limited by the space constraints and the use of such systems is labor intensive since the conveyors must be moved in and out from beneath each of the gates of the railcar to be unloaded.

Thus, there is a need for an improved method of unloading bulk materials from railcars that utilizes a device that is relatively fast and inexpensive to install, and which is reusable.

SUMMARY OF THE INVENTION

The present invention provides a portable railcar unloading pit that is able to be relatively quickly and inexpensively installed, has a high percentage of material recoverable when the project is completed, is able to be repeatedly used at different locations, preferably can be transported over public roads without oversize or weight permits, and has relatively high off-loading rates (tph).

The portable railcar unloading pit includes a pair of opposed sidewalls secured to a back wall to define an enclosure having an at least partially open top and an open front, a hopper secured within the enclosure, with the hopper narrowing downwardly from an inlet proximate the top of the enclosure to an outlet. A pair of rail beams is supported over the inlet of the hopper, and a conveyor extending through the open front of the enclosure and supported beneath the outlet of the hopper. The term conveyor is used herein to refer to a device suitable for transporting bulk material from one place to another in a continuous manner, such as a belt conveyor, screw conveyor, or the like.

BRIEF DESCRIPTION OF THE DRAWINGS

The advantages of the invention will become readily apparent to those skilled in the art from the following detailed description of a preferred embodiment when considered in the light of the accompanying drawings, in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Referring now to FIGS. 1-4 of the drawings, a preferred embodiment of the portable railcar unloading pit 10 of the invention is formed of a rectangular box construction or enclosure having an open front end 12. The bottom of the pit 10 includes a skid 14 having an angled plate 16 and 18 at each end to facilitate sliding movement of the pit 10. Each of the plates 16, 18 may preferably be provided with one or more attachment members, such as the pair of rings 20, for attachment to a means of towing or otherwise moving the pit 10.

Figure 6:
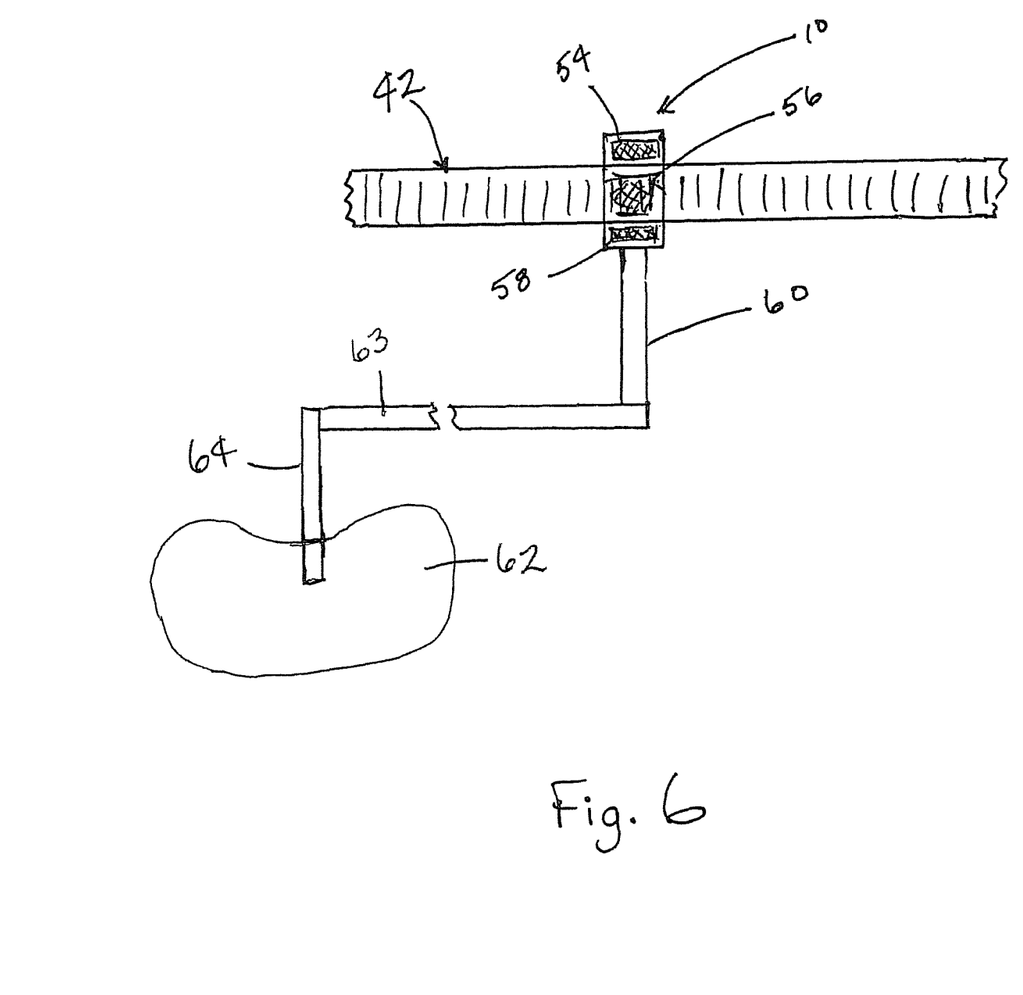
FIG. 6 is a schematic top view of the installed pit shown in FIG. 1 with a conveyor for transporting bulk materials from the pit to a stockpile.

Secured over the skid 14 are a pair of sidewalls 22, a back wall 24, and floor 28. As described below, the open end 12 of the pit 10 is adapted to receive a conveyor (shown schematically at 60 in FIG. 6) that may be supported on the floor 28. A hopper 30 is secured within the pit 10 by various support members 32, 34, and 36, extending longitudinally, transversely, and vertically, respectively. The various support members 32, 34, and 36 also provide support for the sidewalls 22 and back wall 24 when the pit 10 is installed. The hopper 30 extends from the open top of the pit 10 downward to a narrower opening spaced above the floor 28 a sufficient distance to provide clearance for the conveyor and the material being unloaded.

Figure 1:
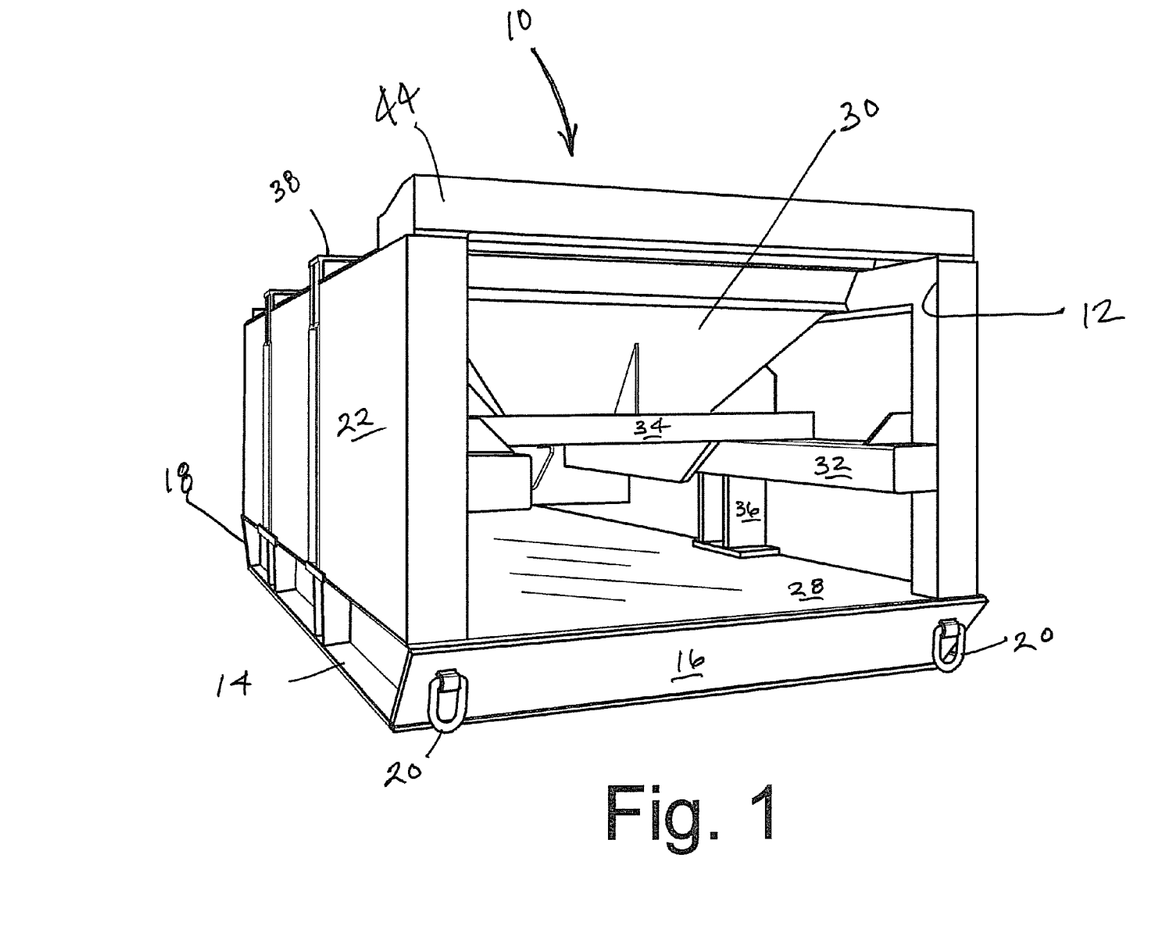
FIG. 1 is a perspective view of an embodiment of the portable railcar unloading pit of the invention.
Figure 2:
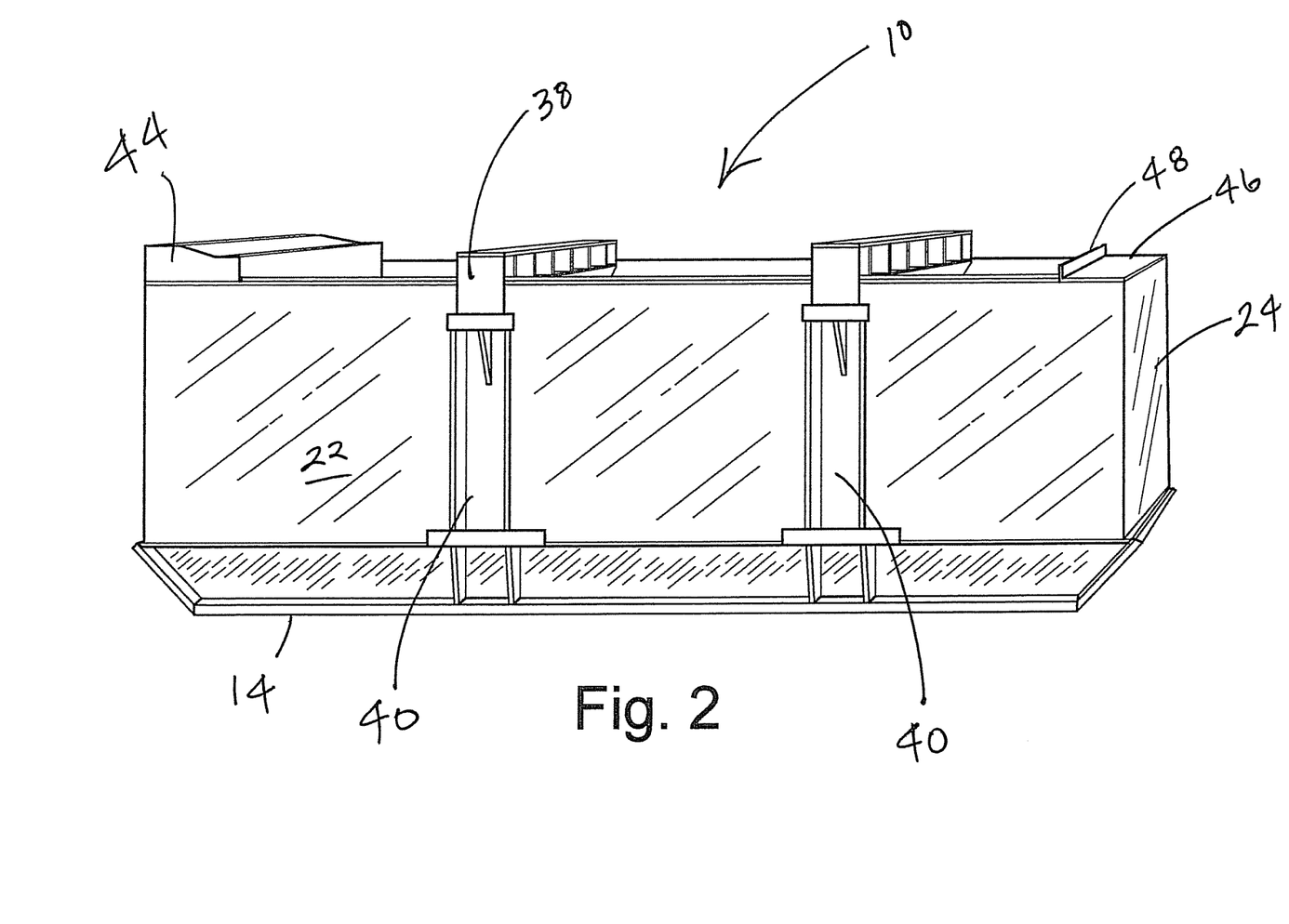
FIG. 2 is a side view of the pit of FIG. 1.
Figure 3:
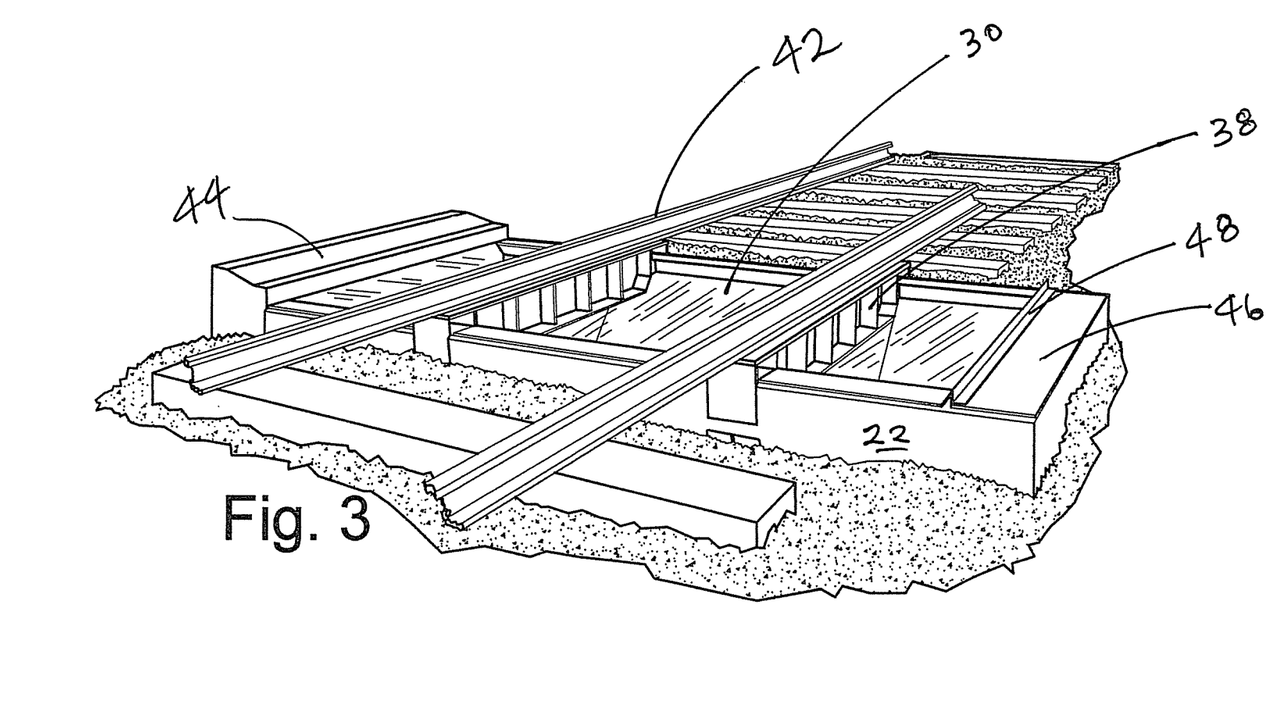
FIG. 3 is a view of the pit of FIG. 1 showing the top of the pit as installed.
Figure 4:
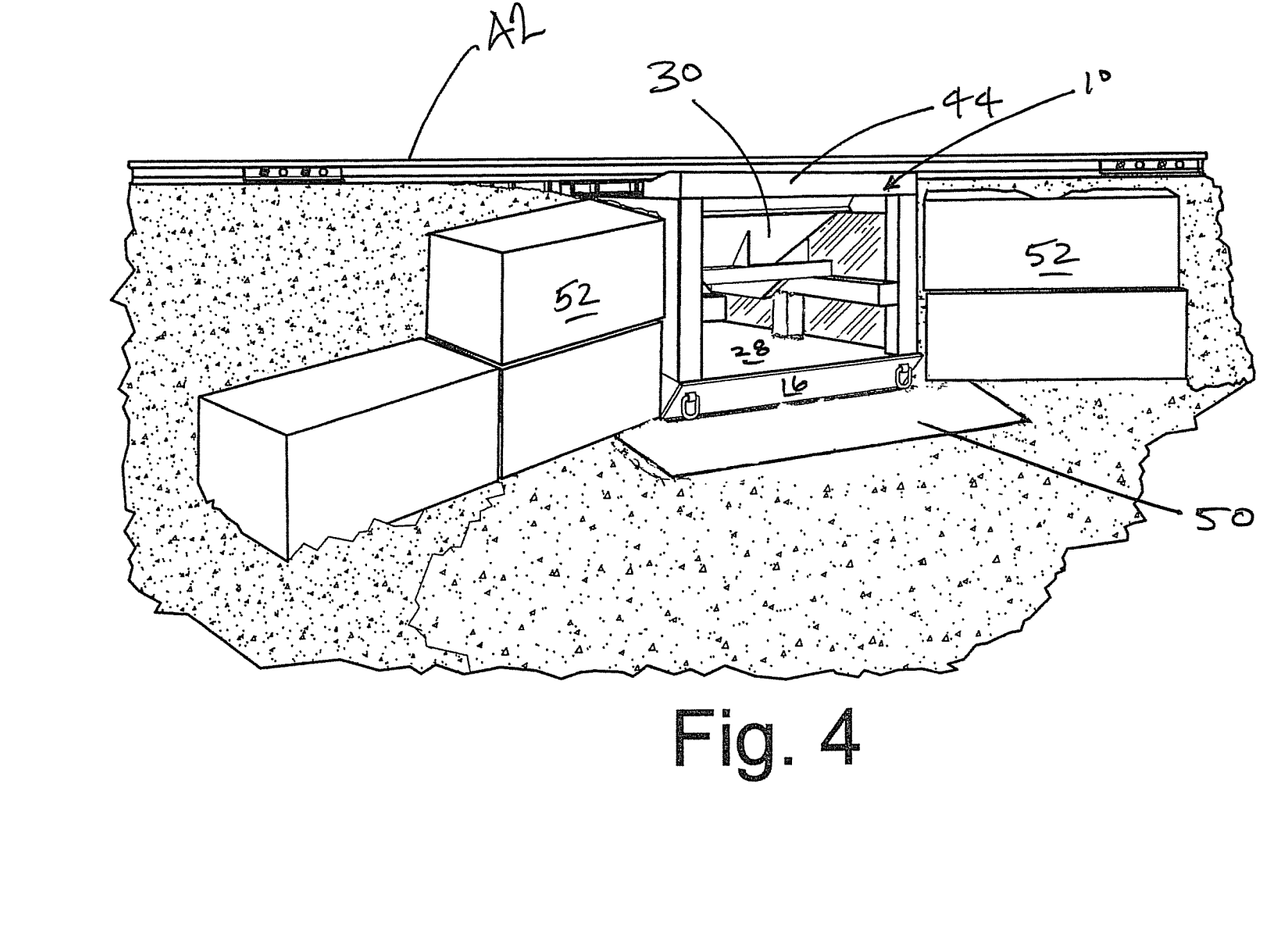
FIG. 4 is a perspective view of the installed pit shown in FIG. 3, showing the open end.

Transversely extending rail beams 38 are supported across the at least partially open top of the hopper 30. Preferably, the rail beams 38 are supported by and secured to the vertical support members 40 forming part of the sidewalls 22, preferably by welding, bolt assemblies, or the like. When the pit 10 is installed, the rail car tracks 42 rest on and are supported by the rail beams 38, as best illustrated in FIG. 4.

The pit 10 may also be provided with a front cross member 44 and rear cross member 46 extending transversely across the open top of the pit 10. The front cross member 44 provides a walk-way for personnel needing to walk across the pit 10. The rear edge of the member 46 also acts as a retainer for a grate (shown at 54 in FIG. 6) that may preferably sit over the open top of the pit. The rear cross member 46 is preferably removably attached to the sidewalls 22 and back wall 24, such as by means of a plurality of bolt assemblies, to provide access to the interior of the pit 10 near the back wall 24 for maintenance and the like. The front edge of the member 46 includes a flange 48 that acts as a retainer for a further grate (shown at 56 in FIG. 6) that may preferably sit over the open top of the pit 10. A third section of grate (shown at 58 in FIG. 6) may preferably be seated at the top of the pit 10 between the pair of rail beams 38.

The various parts of the pit 10 may be formed of any material of suitable strength and durability, but are preferably formed of steel.

According to one preferred method of installing the portable railcar unloading pit 10 at a desired location along an existing length of track, a sufficient number of rail ties are removed and a space sufficient to accommodate the pit 10 beneath the tracks is excavated. The excavated space is also deep enough to allow for an aggregate base and concrete slab 50 on which to support the pit 10. The distance between the top of the slab 50 and the bottom of the rails is preferably slightly less than the height of the pit 10, so that the rails need to be raised slightly while the pit 10 is slid into position beneath the rails, and when the rails are lowered down to rest on the rail beams 38, the rails are somewhat raised. The rails are clipped to the rail beams 38 in a manner well known to those skilled in the art.

With the pit 10 in position, the space adjacent the sidewalls 22 and back wall 24 is backfilled and tamped. Then, if an excess number of ties were removed, those are reinstalled. A retaining wall 52 is preferably constructed on both sides of the open end of the pit 10, most preferably extending at about a 45 degree angle to the open end.

The three sections of grate mentioned above are provided at the open top of the pit 10 to catch oversize material, prevent anyone from falling into the pit 10, and to help regulate the flow of material into and through the hopper 30. Finally, a conveyor 60 is introduced into the open end of the pit 10 and positioned beneath the bottom opening in the hopper 30.

A full rail car can either be pushed or pulled to a position over the pit 10 until the discharge point of the car is directly over the hopper 30. Once the car is located, the conveyor is turned on and the door opened. The bulk material in the car flows through the bottom gate of the car, into the hopper and is discharged by the conveyor to a stockpile (shown schematically as 62 in FIG. 6). The material will slow the feed rate into the hopper once the hopper becomes full. The balance of the remaining material will be kept in the car body, which acts as an additional hopper during the unloading process.

As the conveyor continues to draw the material away from the hopper, more material flows out of the car into the hopper until the car is empty. The balance of the material remaining in the hopper is cleaned out by the conveyor.

Figure 5:
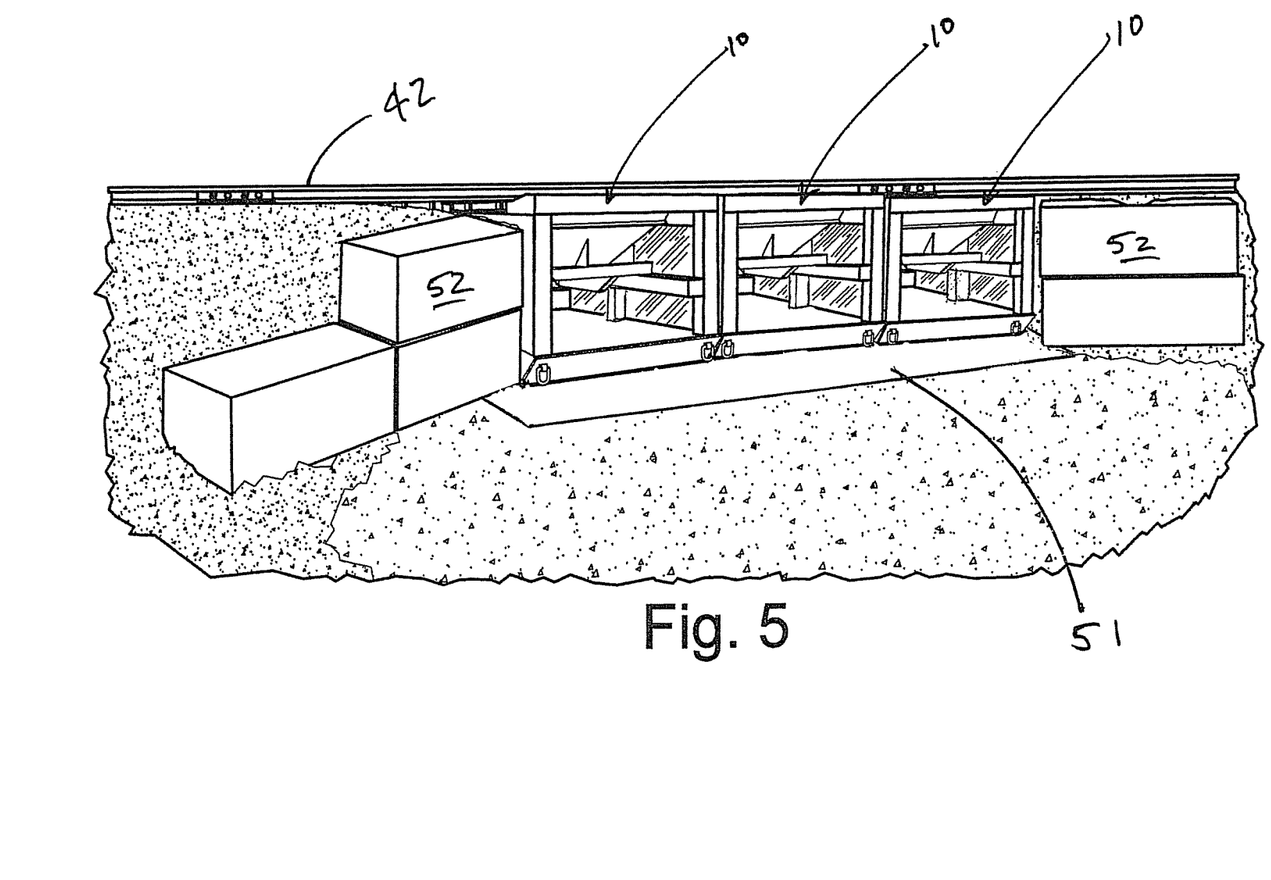
FIG. 5 is perspective view of three of the pits shown in FIG. 1 installed in a side-by-side arrangement.
Figure 7:
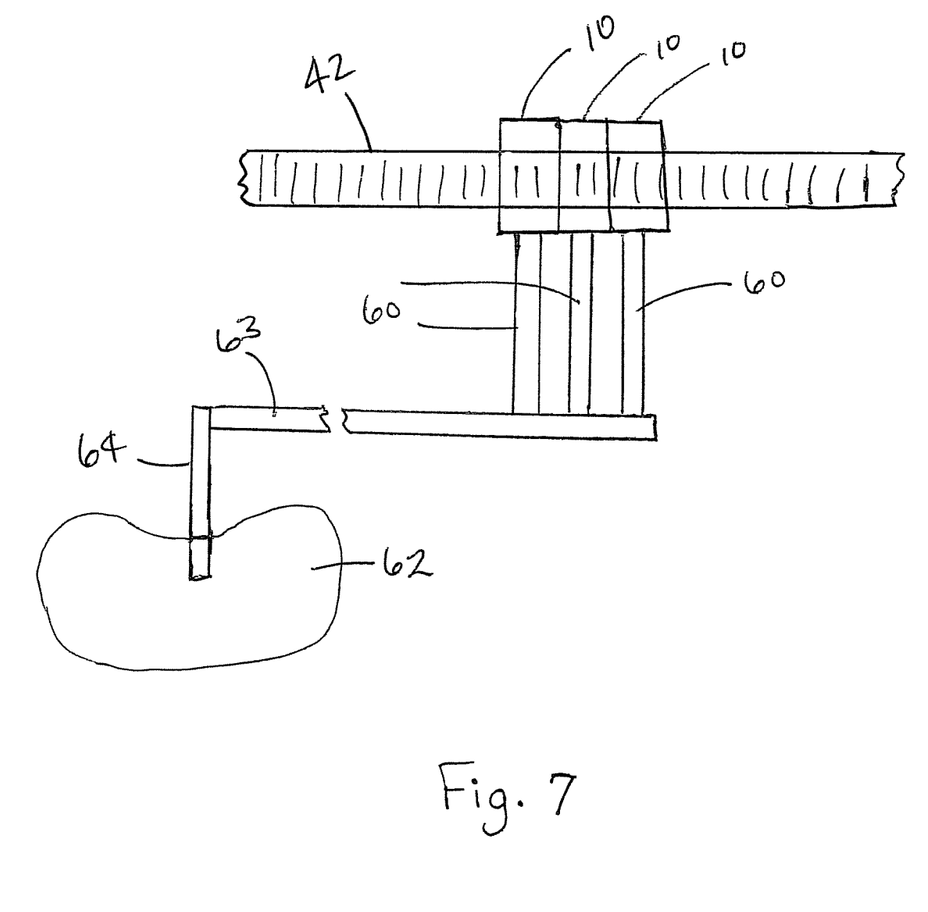
FIG. 7 is a schematic top view of the three installed pits shown in FIG. 5 with a conveyor for transporting bulk materials from each pit to a stockpile.

The design according to the invention has benefits over other rail unloading pits because the cars do not need to be pushed or pulled over a ramp with a locomotive as some portable systems use, can be installed relatively economically, have the option to be reused at another location with minimum foundations left at the original installation, does not require the typical volume of excavation, and has the capacity to meet the required production levels.

Where desired to achieve higher unloading rates, multiple portable railcar unloading pits in accordance with the invention may be installed side by side, for example as shown in FIG. 5. In this situation, it may be desirable to use a single concrete slab 51 on which to support the multiple pits 10. A separate conveyor would be introduced into each of the pits, as shown in FIG. 7. Each of the separate conveyors may then transport the bulk materials being unloaded to a single gathering conveyor 63 and then to a stacker 64 to transport and unload the materials to form a stockpile 62.

Figure 8:
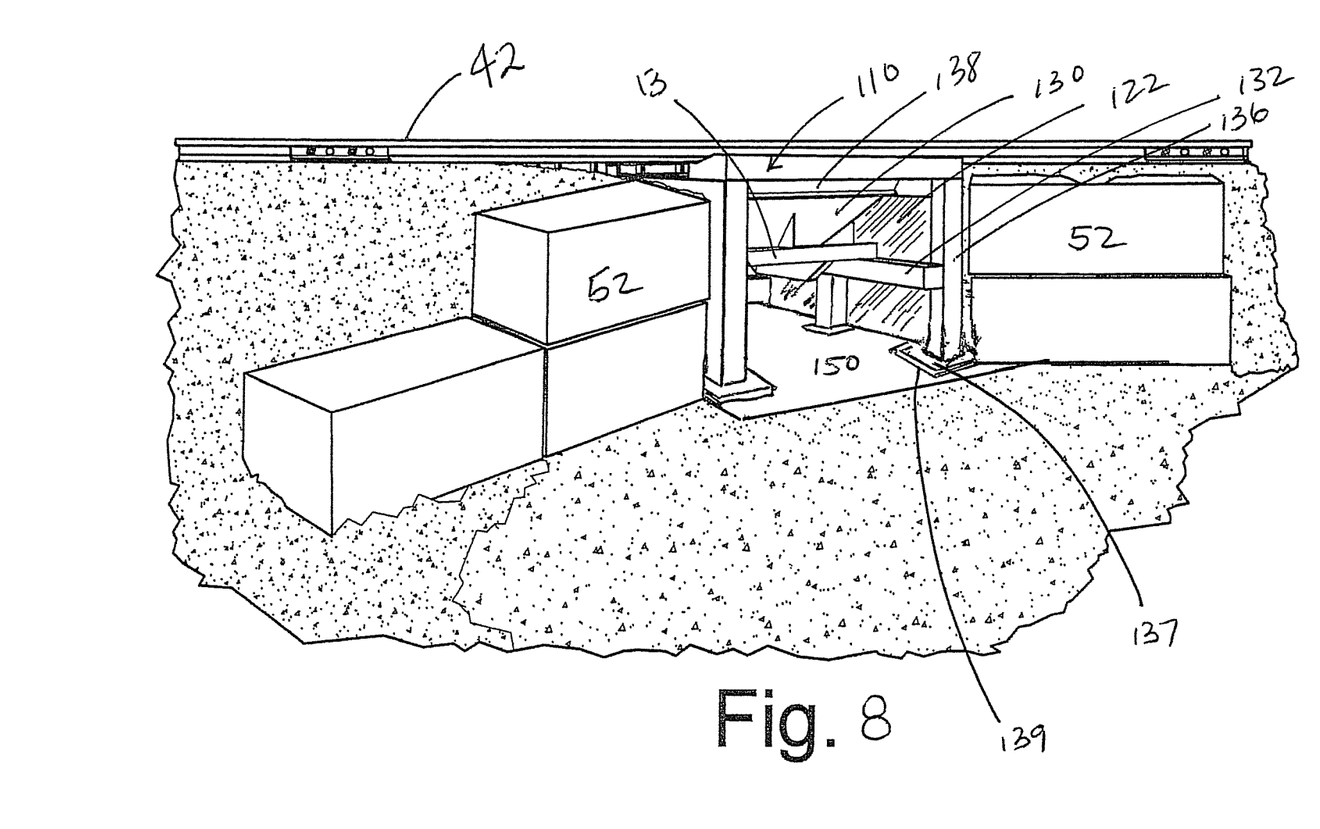
FIG. 8 is a perspective view of an alternate embodiment of the portable railcar unloading pit of the invention as installed.

Referring now to FIG. 8 of the drawings, an alternate embodiment of the portable railcar unloading pit of the invention is shown as installed. The pit 110 of this embodiment is identical to the embodiment of FIG. 1, except that it lacks a floor and skid. The box includes an open end 112, sidewalls 122, and a back wall. A hopper 130 is secured within the pit 110 by various support members 132, 134, and 136, extending longitudinally, transversely, and vertically, respectively. The various support members 132, 134, and 136 also provide support for the sidewalls 122 and back wall when the pit 110 is installed. The vertical support members 136 are preferably longer than in the embodiment of FIG. 1 to provide the additional clearance otherwise provided by the floor and skid. First bearing plates 137 are secured, preferably by welding, to the bottom ends of the vertical support members. Upon installation, these first bearing plates 137 align with and are secured, preferably by welding, to second bearing plates 139 cast in the top of a concrete slab 150. The remaining elements of the pit 110 are identical to those of the pit 10. Thus, for example, the rail car tracks 42 rest on and are supported by the rail beams 138.

Figure 9:
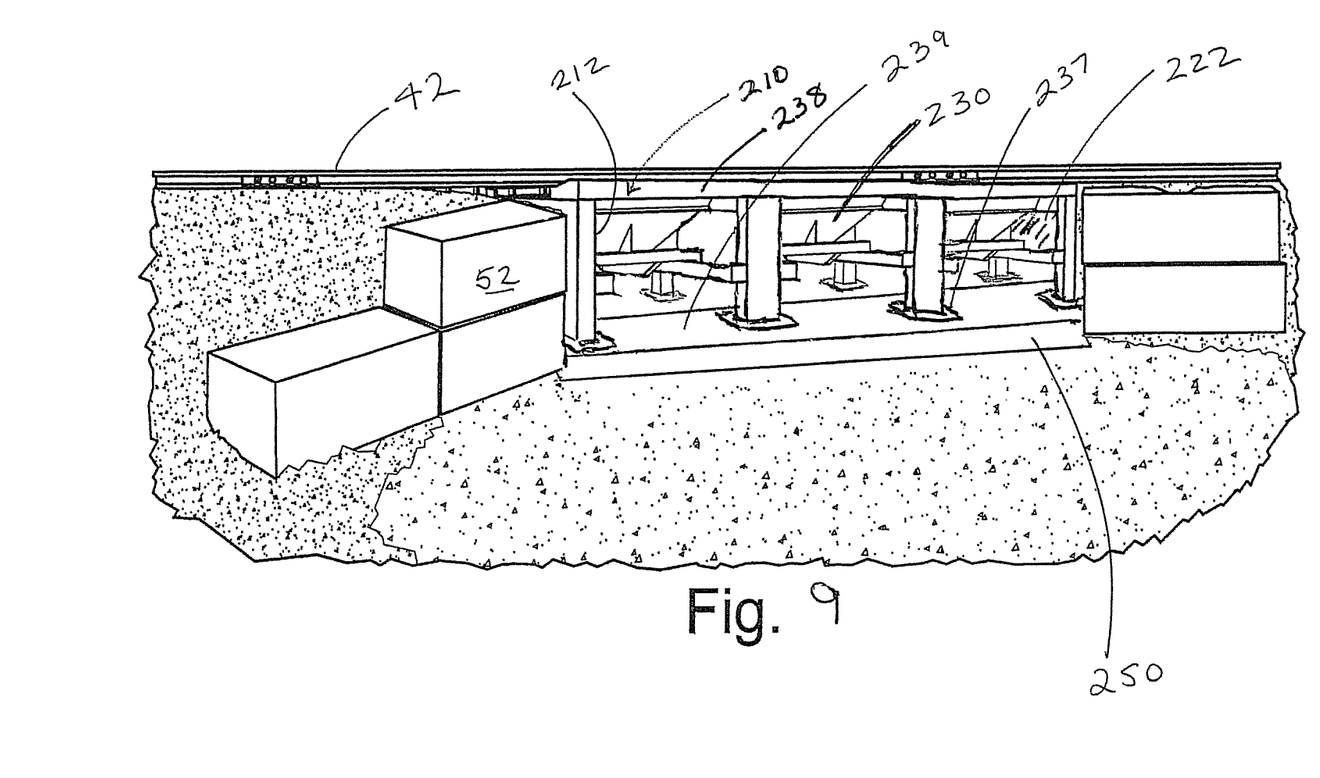
FIG. 9 is a perspective view of a further embodiment of the portable railcar unloading pit of the invention having three hoppers.

In a still further embodiment of the invention, illustrated in FIG. 9, a single pit may be formed that includes three hoppers secured within a box-like construction. Thus, in the embodiment of FIG. 9, a portable railcar unloading pit 210 is shown as installed. The pit 210 of this embodiment is similar to the embodiment of FIG. 8, in that it lacks a floor and skid, and is further similar to the embodiment of FIG. 5 in that it includes more than one hopper. As shown, the box includes an open end 212, sidewalls 222, and a back wall. Three hoppers 230 are secured within the pit 210 by various support members extending longitudinally, transversely, and vertically within the box. The various support members also provide support for the sidewalls 222 and back wall when the pit 210 is installed. The vertical support members are preferably sufficiently long to provide the additional clearance otherwise provided by the floor and skid. First bearing plates 237 are secured, preferably by welding, to the bottom ends of the vertical support members. Upon installation, these first bearing plates 237 align with and are secured, preferably by welding, to one or more second bearing plates cast in the top of a concrete slab 250. Preferably, there is a single second bearing plate 239 running the length of the pit 210 in the direction of the rails 42 to which each of the first bearing plates 237 is secured. In this embodiment, there are preferably no sidewalls provided between the hoppers 230, although there are vertical support members for the rail beams between the hoppers.

According to one preferred method of installing the portable railcar unloading pit 210 of FIG. 9 at a desired location along an existing length of track, a sufficient number of rail ties are removed and a space sufficient to accommodate the pit beneath the tracks is excavated. The excavated space is also deep enough to allow for an aggregate base and concrete slab 250 on which to support the pit. The distance between the top of the slab and the bottom of the rails is preferably slightly less than the height of the pit 210, so that the rails need to be raised slightly while the pit is positioned beneath the rails, and when the rails are lowered down to rest on the rail beams 238, the rails are somewhat raised. The bearing plates and rebar are positioned as desired and the concrete slab 250 is poured and allowed to cure.

It is preferred to set the middle hopper 230 first, with the related support members, welding the bearing plates on the vertical members to the bearing plates in the concrete slab. Then the left and right hoppers, with their associated support members, can be positioned, bolted to the middle support members, and the bearing plates on their associated vertical members welded to the bearing plates in the concrete slab. The rail supporting beams 238 are secured to the various vertical support members.

The sidewalls and back wall are secured to the various support members, and the space adjacent the sidewalls and back wall is backfilled and tamped. Then, if an excess number of ties were removed, those are reinstalled, and the rails 42 are clipped to the rail beams 238. A retaining wall 52 is preferably constructed on both sides of the open end of the pit 210, most preferably extending at about a 45 degree angle to the open end. A conveyor is introduced into the open end of the pit 210 and positioned beneath the bottom opening of each of the hoppers 230.

A full rail car can either be pushed or pulled to a position over the pit 210 until the discharge point of the car is directly over each hopper 230. Once the car is located, the conveyors are turned on and the gates opened. The bulk material in the car flows through the gates, into the hoppers, and is discharged by the conveyors to a stockpile.

In accordance with the provisions of the patent statutes, the invention has been described in what is considered to represent its preferred embodiments. However, it should be noted that the invention can be practiced otherwise than as specifically illustrated and described without departing from its spirit or scope.

What is claimed is:

1. A portable railcar unloading pit, comprising:
   a pair of opposed sidewalls secured to a back wall to define an enclosure having an at least partially open top and an open front, the sidewalls and back wall being formed of steel;
   a floor extending between and secured to the opposed sidewalls and the back wall;
   a skid secured to the floor;
   a hopper secured within the enclosure, the hopper narrowing downwardly from an inlet proximate the top of the enclosure to an outlet, the outlet of the hopper being spaced apart from each of the opposed sidewalls;
   a pair of rail beams extending transversely to the sidewalls and supported over the inlet of the hopper such that rail car tracks are able to rest on and be supported by the rail beams; and
   a conveyor extending through the open front of the enclosure and supported beneath the outlet of the hopper.

2. The portable railcar unloading pit of claim 1, wherein the skid comprises an angled plate at the open front end of the enclosure.

3. The portable railcar unloading pit of claim 2, wherein the skid further comprises an angled plate at the back wall of the enclosure.

4. The portable railcar unloading pit of claim 1, further comprising one or more attachment members secured to the pit at the open front of the enclosure.

5. The portable railcar unloading pit of claim 1, further comprising one or more rings secured to the skid.

6. The portable railcar unloading pit of claim 1, wherein the conveyor is comprised of a belt conveyor.

7. The portable railcar unloading pit of claim 1, further comprising one or more grates covering the at least partially open top of the enclosure.

8. The portable railcar unloading pit of claim 7, further comprising at least one grate positioned between the pair of rail beams, at least one grate positioned towards the back wall from both rail beams, and at least one grate positioned towards the open front from both rail beams.

9. The railcar unloading pit of claim 1, further comprising a retaining wall supported adjacent the open front of the enclosure.

10. The portable railcar unloading pit of claim 1, wherein the rail beams are supported by and secured to vertical support members.

11. The portable railcar unloading pit of claim 1, wherein the conveyor extends through the open front of the enclosure and is supported beneath and in vertical alignment with the outlet of the hopper.

12. The portable railcar unloading pit of claim 1, wherein the pair of opposed sidewalls terminate at one end in the open front of the defined enclosure.

13. A portable railcar unloading pit, comprising:
   a pair of opposed sidewalls secured to a back wall to define an enclosure having an at least partially open top and an open front, the sidewalls and back wall being formed of steel;
   a floor extending between and secured to the opposed sidewalls and the back wall;
   one or more attachment members secured to the pit at the open front of the enclosure;
   a hopper secured within the enclosure, the hopper narrowing downwardly from an inlet proximate the top of the enclosure to an outlet, the outlet of the hopper being spaced apart from each of the opposed sidewalls;
   a pair of rail beams extending transversely to the sidewalls and supported over the inlet of the hopper such that rail car tracks are able to rest on and be supported by the rail beams; and
   a conveyor extending through the open front of the enclosure and supported beneath the outlet of the hopper.

14. A portable railcar unloading pit, comprising:
   a pair of opposed sidewalls secured to a back wall to define an enclosure having an at least partially open top and an open front, the sidewalls and back wall being formed of steel;

a hopper secured within the enclosure, the hopper narrowing downwardly from an inlet proximate the top of the enclosure to an outlet, the outlet of the hopper being spaced apart from each of the opposed sidewalls;

a pair of rail beams extending transversely to the sidewalls and supported over the inlet of the hopper such that rail car tracks are able to rest on and be supported by the rail beams;

a retaining wall supported adjacent the open front of the enclosure; and a conveyor extending through the open front of the enclosure and supported beneath the outlet of the hopper.

15. The portable railcar unloading pit of claim 14, secured in side-to-side relationship with a second railcar unloading pit that comprises:

a pair of opposed sidewalls secured to a back wall to define an enclosure having an at least partially open top and an open front, the sidewalls and back wall being formed of steel;

a hopper secured within the enclosure, the hopper narrowing downwardly from an inlet proximate the top of the enclosure to an outlet;

a pair of rail beams supported over the inlet of the hopper; and a conveyor extending through the open front of the enclosure and supported beneath the outlet of the hopper.

16. The portable railcar unloading pit of claim 15, secured in side-to-side relationship with a third railcar unloading pit that comprises:

a pair of opposed sidewalls secured to a back wall to define an enclosure having an at least partially open top and an open front, the sidewalls and back wall being formed of steel;

a hopper secured within the enclosure, the hopper narrowing downwardly from an inlet proximate the top of the enclosure to an outlet;

a pair of rail beams supported over the inlet of the hopper; and a conveyor extending through the open front of the enclosure and supported beneath the outlet of the hopper.

17. The portable railcar unloading pit of claim 14, wherein the conveyor extends through the open front of the enclosure such that a portion of the conveyor lies within the enclosure and a portion of the conveyor lies outside of the enclosure.

18. A portable railcar unloading pit, comprising:

a pair of opposed sidewalls secured to a back wall to define an enclosure having an at least partially open top and an open front, the sidewalls and back wall being formed of steel;

a hopper secured within the enclosure, the hopper narrowing downwardly from an inlet proximate the top of the enclosure to an outlet, the outlet of the hopper being spaced apart from each of the opposed sidewalls;

a pair of rail beams extending transversely to the sidewalls and supported over the inlet of the hopper such that rail car tracks are able to rest on and be supported by the rail beams; and a conveyor extending through the open front of the enclosure and supported beneath the outlet of the hopper;

wherein the hopper is defined as a first hopper and the unloading pit further comprises a second hopper secured within the enclosure, the second hopper narrowing downwardly from an inlet proximate the top of the enclosure to an outlet; the pair of rail beams being supported over the inlet of the second hopper; and a second conveyor extending through the open front of the enclosure and being supported beneath the outlet of the second hopper; and wherein one or more vertical support members are positioned between the first hopper and the second hopper, the one or more vertical support members supporting the pair of rail beams.

19. The portable railcar unloading pit of claim 18, further comprising a third hopper secured within the enclosure, the third hopper narrowing downwardly from an inlet proximate the top of the enclosure to an outlet; the pair of rail beams being supported over the inlet of the third hopper; and a third conveyor extending through the open front of the enclosure and being supported beneath the outlet of the third hopper.

20. The portable railcar unloading pit of claim 19, further comprising one or more vertical support members positioned between the second hopper and the third hopper, the one or more vertical support members supporting the pair of rail beams.

21. A portable railcar unloading pit, comprising:

a pair of opposed sidewalls secured to a back wall to define an enclosure having an at least partially open top and an open front, the sidewalls and back wall being formed of steel;

a hopper secured within the enclosure, the hopper narrowing downwardly from an inlet proximate the top of the enclosure to an outlet, the outlet of the hopper being spaced apart from each of the opposed sidewalls;

a pair of rail beams extending transversely to the sidewalls and supported over the inlet of the hopper such that rail car tracks are able to rest on and be supported by the rail beams, wherein the rail beams are supported by and secured to vertical support members; and a conveyor extending through the open front of the enclosure and supported beneath the outlet of the hopper.

\* \* \* \* \*